US008098856B2

(12) United States Patent
Hjort et al.

(10) Patent No.: US 8,098,856 B2
(45) Date of Patent: Jan. 17, 2012

(54) WIRELESS COMMUNICATIONS DEVICES WITH THREE DIMENSIONAL AUDIO SYSTEMS

(75) Inventors: Staffan Fredrik Hjort, Malmo (SE); Olof Johannes Carlsson, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1464 days.

(21) Appl. No.: 11/472,786

(22) Filed: Jun. 22, 2006

(65) Prior Publication Data

US 2007/0297625 A1 Dec. 27, 2007

(51) Int. Cl.
*H04R 5/02* (2006.01)

(52) U.S. Cl. ............ 381/310; 381/307; 381/17; 345/419

(58) Field of Classification Search .................. 381/300, 381/307, 309, 311, 320, 17, 18, 1, 2, 74, 381/306, 87, 332, 334, 386, 388; 345/419, 345/156; 715/716; 455/556.1, 556.2, 567, 455/566; 700/94
See application file for complete search history.

(56) References Cited

U.S. PATENT DOCUMENTS

| 5,438,623 | A | * | 8/1995 | Begault ........................... 381/17 |
| 5,815,142 | A | | 9/1998 | Allard et al. |
| 6,404,442 | B1 | | 6/2002 | Hilpert, Jr. et al. |
| 7,084,859 | B1 | * | 8/2006 | Pryor ........................... 345/173 |
| 7,487,467 | B1 | * | 2/2009 | Kawahara et al. ............. 715/810 |
| 2003/0044002 | A1 | * | 3/2003 | Yeager et al. ................. 379/444 |
| 2003/0098892 | A1 | | 5/2003 | Hiipakka |
| 2005/0035951 | A1 | * | 2/2005 | Bjorkengren ................. 345/173 |
| 2007/0098191 | A1 | * | 5/2007 | Wan et al. ..................... 381/306 |

FOREIGN PATENT DOCUMENTS

| EP | 0 963 090 A2 | 12/1999 |
| EP | 1 555 852 A2 | 7/2005 |
| EP | 1 657 892 A1 | 5/2006 |
| JP | 2005269231 | 9/2005 |

OTHER PUBLICATIONS

"Pointing Device for Visually Handicapped Users," IBM Technical Disclosure Bulletin, vol. 38, No. 7, Jul. 1995, p. 469-471.
International Search Report and Written Opinion of the International Searching Authority, corresponding to PCT/US2006/070151, mailed Apr. 20, 2007.
Communication from the European Patent Office for the corresponding European patent application, issued Apr. 27, 2009.

* cited by examiner

*Primary Examiner* — Vivian Chin
*Assistant Examiner* — Leshui Zhang
(74) *Attorney, Agent, or Firm* — Myers Bigel Sibley & Sajovec, P.A.

(57) ABSTRACT

Mobile terminals having three dimensional audio capabilities for making sound appear to originate from any location within a three dimensional space and to facilitate navigational movement among displayed information are provided. A mobile terminal includes a housing that encloses a processor and one or more speakers. A display is located on the housing that is in communication with the processor, and a keypad is located on the housing that is in communication with the processor and that is responsive to user input for navigating a cursor within the display. The mobile terminal includes a three dimensional audio system that is in communication with the processor and speaker(s). The three dimensional audio system audibly indicates navigational movement of the cursor in the display, and is configured to make sound emitted by the speaker(s) appear to originate from any of a plurality of locations in a virtual three dimensional space.

18 Claims, 5 Drawing Sheets

WIRELESS COMMUNICATIONS DEVICES WITH THREE DIMENSIONAL AUDIO SYSTEMS

FIELD OF THE INVENTION

The present invention relates generally to wireless communications devices, and more particularly to wireless communications devices, such as radiotelephones.

BACKGROUND OF THE INVENTION

With the increased mobility of today's workforce, the demand for mobile communications capabilities has also increased. As a result, many portable or "hand-held" communications devices may perform a variety of computing and communications functions. For example, in addition to sending and receiving wireless (e.g., radiotelephone) communications, hand-held communications devices can be used for organizing information in calendars and address books, sending and retrieving e-mail, Web browsing, and data-sharing over the Internet, intranet or corporate networks. Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems.

Hand-held communications devices, such as radiotelephones, typically utilize displays, such as liquid crystal displays (LCDs), as input/output devices for various functions and applications. Unfortunately, small displays can present challenges to users, particularly when navigating through lists of information and when tab browsing among multiple panes of information. It can be easy for a user to become lost or confused as to where he or she is within a list or among multiple panes of information. As such there is a need for facilitating navigation through information displayed within the displays of radiotelephones wherein users easily know where they are. In addition, as competition increases among manufacturers of radiotelephones, there is a marketing need for new functions and features.

SUMMARY OF THE INVENTION

In view of the above discussion, mobile terminals, such as radiotelephones, having three dimensional audio capabilities for making sound appear to originate from any location within a three dimensional space and to facilitate navigational movement among displayed information are provided. According to some embodiments of the present invention, a mobile terminal includes a housing that encloses a processor and one or more speakers. A display is located on the housing that is in communication with the processor, and a keypad is located on the housing that is in communication with the processor and that is responsive to user input for navigating a cursor within the display. The mobile terminal includes a three dimensional audio system that is in communication with the processor and speaker(s). The three dimensional audio system audibly indicates navigational movement of the cursor in the display. In addition, the three dimensional audio system is configured to make sound emitted by the speaker(s) appear to originate from any of a plurality of locations in a virtual three dimensional space.

According to some embodiments of the present invention, the three dimensional audio system is configured to make sound appear to originate from wherever the cursor is located on the mobile terminal display.

According to some embodiments of the present invention, the three dimensional audio system is configured to make a user of the mobile terminal appear to be positioned at a generally central location in the virtual three dimensional space.

According to some embodiments of the present invention, the three dimensional audio system is configured to play music, and wherein the three dimensional audio system is configured to make music appear to originate from multiple locations in the virtual three dimensional space.

According to some embodiments of the present invention, the three dimensional audio system is configured to vary one or more of pitch, tone and volume of sound emitted from the speaker(s).

According to some embodiments of the present invention, a radiotelephone includes a housing that encloses a processor and one or more speakers. A display is located on the housing that is in communication with the processor, and a keypad is located on the housing that is in communication with the processor and that is responsive to user input for navigating a cursor within the display. The radiotelephone includes a three dimensional audio system that is in communication with the processor and speaker(s). The three dimensional audio system audibly indicates navigational movement of the cursor via the speaker(s), and is configured to make sound emitted by the speaker appear to originate from any of a plurality of locations in a virtual three dimensional space. According to some embodiments of the present invention, the three dimensional audio system is configured to make a user of the radiotelephone appear to be positioned at a generally central location in the virtual three dimensional space.

According to some embodiments of the present invention, the radiotelephone three dimensional audio system is configured to make sound appear to originate from a two dimensional matrix located in front of the user in response to user movement of the cursor within the display.

According to some embodiments of the present invention, the radiotelephone three dimensional audio system is configured to make a ringtone appear to originate from any location in the virtual three dimensional space in response to receiving an incoming call signal. For example, a ringtone can appear to originate in front of a user in the virtual three dimensional space.

According to some embodiments of the present invention, the radiotelephone is configured to play music, and a three dimensional audio system is configured to make music appear to originate from multiple locations in the virtual three dimensional space.

According to some embodiments of the present invention, in response to the radiotelephone receiving an incoming call signal, the three dimensional audio system is configured to make music that is playing appear to originate from a location in the virtual three dimensional space that is behind the user and to make a ringtone appear to originate from a location in the virtual three dimensional space that is in front of the user.

According to some embodiments of the present invention, the radiotelephone comprises a plurality of speakers, and the three dimensional audio system is configured to variably time delay sound signals provided to the speakers to vary location of the perceived source of the combined sound emitted from the speakers.

According to some embodiments of the present invention, the radiotelephone comprises a plurality of speakers, and the three dimensional audio system is configured to vary volume and/or tonal characteristics of sound signals provided to the speakers to vary location of the perceived source of the combined sound emitted from the speakers.

According to some embodiments of the present invention, navigational movement of a cursor within the radiotelephone display is indicated, via the three dimensional audio system, by variations in one or more of pitch, tone and volume.

According to some embodiments of the present invention, a mobile terminal, such as a radiotelephone, includes a hands free headset that is in wireless communication with the mobile terminal's processor and three dimensional audio system. The headset includes an earplug that is configured to be inserted into the ear of a user and that includes one or more speakers. The three dimensional audio system is configured to make a user of the headset and mobile terminal appear to be positioned at a generally central location in the virtual three dimensional space and to make sound appear to originate from any location in the virtual three dimensional space.

DETAILED DESCRIPTION OF THE INVENTION

Figure 1:
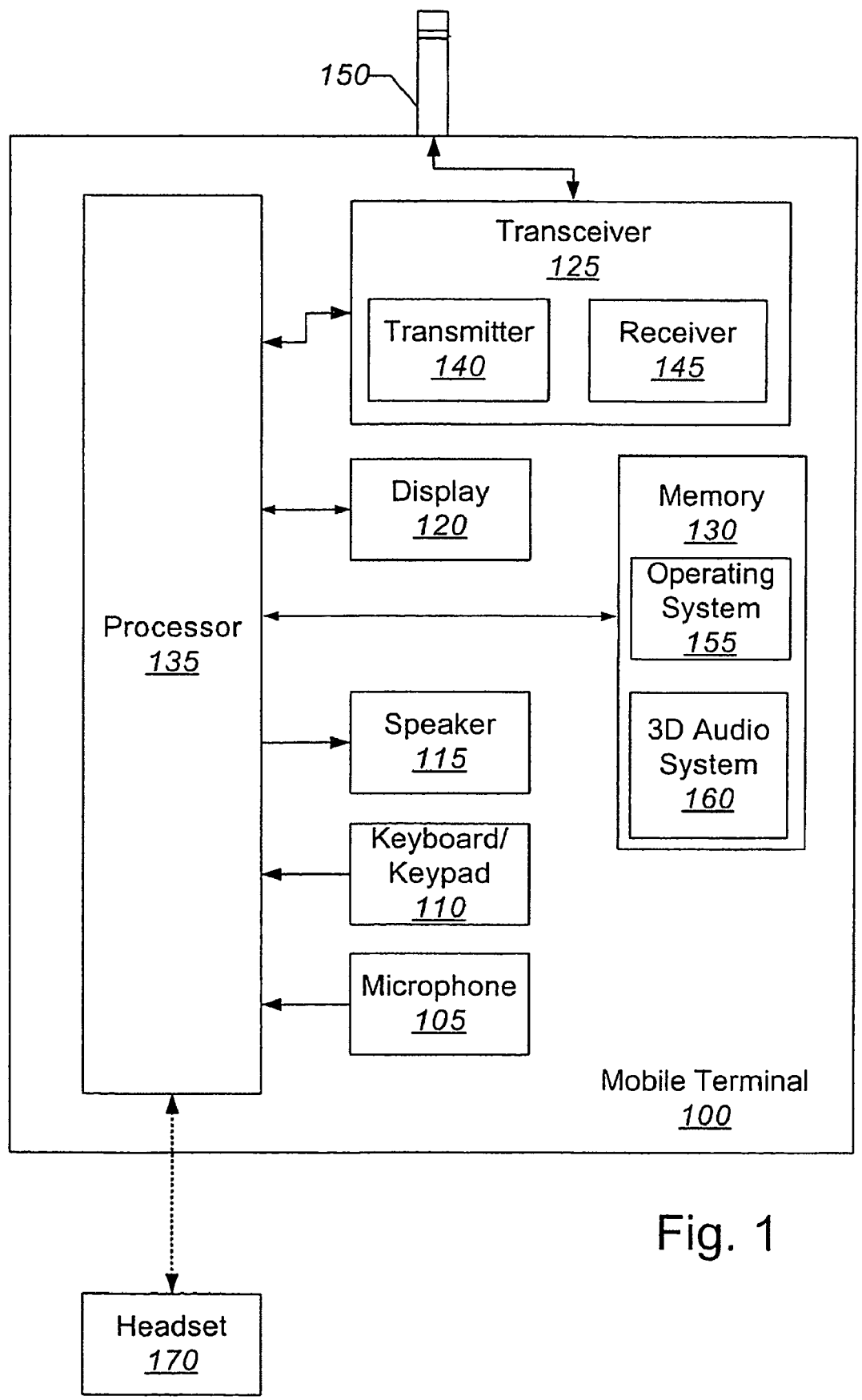
FIG. 1 is a block diagram that illustrates a mobile terminal in accordance with some embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal, such as a radiotelephone. It will be understood, however, that the present invention is not limited to such embodiments and may be embodied generally as an electronic device that utilizes a display to display information and a keypad to allow user navigation through displayed information.

Computer program code for carrying out operations of a three dimensional audio system discussed herein may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to block diagram illustrations of mobile terminals in accordance with exemplary embodiments of the invention. These block diagrams further illustrate exemplary operations for making sound emitted by the speaker(s) of a mobile terminal and headset associated therewith appear to originate from any of a plurality of locations in a virtual three dimensional space and to facilitate navigational movement among displayed information, in accordance with some embodiments of the present invention. It will be understood that each block of the flowchart and/or block diagram illustrations, and combinations of blocks in the flowchart and/or block diagram illustrations, may be implemented by computer program instructions and/or hardware operations.

Referring now to FIG. 1, an exemplary mobile terminal 100, in accordance with some embodiments of the present invention, comprises a microphone 105, a keyboard/keypad 110, one or more speakers 115, a display 120, a transceiver 125, and a memory 130 that communicate with a processor 135. The transceiver 125 comprises a transmitter circuit 140 and a receiver circuit 145, which respectively transmit outgoing radio frequency signals to base station transceivers and receive incoming radio frequency signals from the base station transceivers via an antenna 150. The radio frequency signals transmitted between the mobile terminal 100 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 100 may be included in many conventional mobile terminals and their functionality is generally known to those skilled in the art.

The processor 135 communicates with the memory 130 via an address/data bus. The processor 135 may be, for example, a commercially available or custom microprocessor. The memory 130 is representative of the one or more memory devices containing the software and data used to provide audible feedback to a user navigating through information displayed on the mobile terminal 100, in accordance with some embodiments of the present invention. The memory 130 may include, but is not limited to, the following types of devices: cache, ROM, PROM, EPROM, EEPROM, flash, SRAM, and DRAM.

The memory 130 may contain various categories of software and/or data. For example, as illustrated in FIG. 1, the memory 130 includes an operating system 155 and a three dimensional audio system 160. The operating system 155 generally controls the operation of the mobile terminal 100. In particular, the operating system 155 may manage the mobile terminal's software and/or hardware resources and may coordinate execution of programs by the processor 135. The three dimensional audio system 160 is configured to make sound emitted by the speaker(s) appear to originate from any of a plurality of locations in a virtual three dimensional space and to facilitate navigational movement among displayed information, as described further herein.

Although FIG. 1 illustrates an exemplary software and hardware architecture that may be used to provide audible feedback to a user navigating through information displayed on an electronic device, such as a mobile terminal, it will be understood that the present invention is not limited to such a configuration but is intended to encompass any configuration capable of carrying out the operations described herein.

Figure 2:
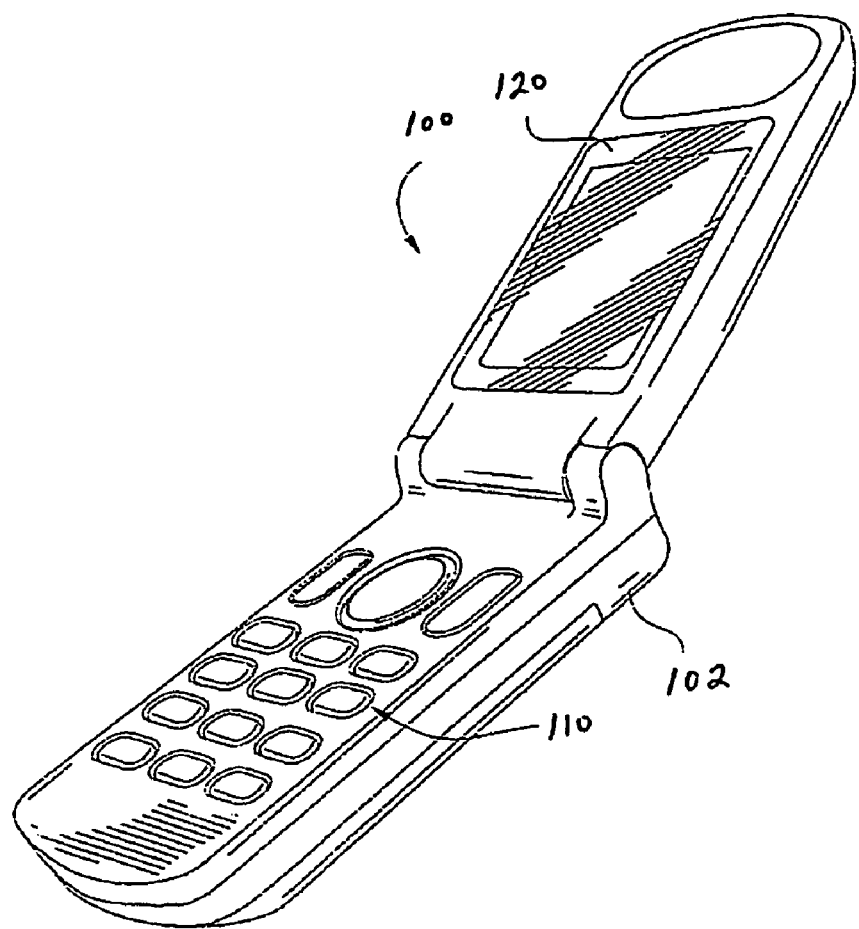
FIG. 2 is a perspective view of a mobile terminal that incorporates a three dimensional audio system in accordance with some embodiments of the present invention.

Referring now to FIG. 2, a perspective view of a mobile terminal 100, such as a radiotelephone, is illustrated and includes a housing 102 that encloses the various components illustrated in FIG. 1 (i.e., a transceiver 125, memory 130, processor 135, one or more speakers 115 and microphone 105). A display 120 and keypad 110 are located on the housing 102, as illustrated. As would be understood by those skilled in the art, the keypad 110 is responsive to user input for navigating a cursor within the display 120, thereby allowing a user to scroll through displayed information, select displayed items, enter telephone numbers, enter alphanumeric data, tab browse through multiple panes of information, etc. The illustrated mobile terminal 100 also includes a three dimensional audio system (160, FIG. 1) that is in communication with the processor and speaker(s). The three dimensional audio system is configured to audibly indicate, via the speaker(s), navigational movement of a cursor within the display 120 by a user.

Figure 3:
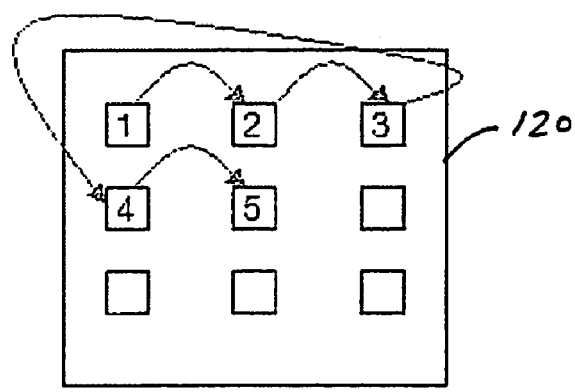
FIG. 3 is a block diagram that schematically illustrates a user sequentially pressing keys "1", "2", "3", "4" and "5" on a keypad of a mobile terminal.

According to some embodiments of the present invention, cursor movement can be audibly indicated by varying pitch, tone and/or volume of sound emitted by the speaker(s). For example, as illustrated in FIG. 3, a user has sequentially pressed keypad keys "1", "2", "3", "4" and "5", which may be represented on the display as cursor movement such as dialing a phone number, alphanumeric character entry, scrolling through data, etc. The three dimensional audio system 160 audibly indicates these keypad strokes as they are displayed within the display 120 by varying pitch, tone and/or volume. For example, the sound emitted when the user presses the "1" key may have a first pitch, the "2" key, when pressed, may have a second pitch different from the first pitch, the "3" key, when pressed, may have a third pitch that is different from the first and second pitches, and so on. If a certain pitch, tone and/or volume is associated with each keypad key, a user will be able to audibly detect if the correct key has been pressed in certain operations. This may facilitate use of the mobile terminal 100 by users who are visually impaired.

According to some embodiments of the present invention, the three dimensional audio system 160 is configured to make sound emitted by the speaker(s) of the mobile terminal 100 appear to originate from any of a plurality of locations in a virtual three dimensional space. Various three dimensional audio technologies are known and may be used to implement the functions of the three dimensional audio system 160. In general, three dimensional audio technology has the ability to position sounds as originating at any location (in front of, behind, above, below, to the sides) with respect to a listener. The sounds are actually created by the speakers (or headphones) of a device, but the listener's perception is that the sounds originate from arbitrary points in space. To transform sound to appear to originate from a location within a virtual three dimensional space, three dimensional audio technology modifies one or more of time delay, amplitude, and tonal transformation for a particular sound. For example, the three dimensional location of a sound source as perceived by a user may be varied by varying the relative time delay, amplitude, and/or tonal characteristics of sound signals provided to a plurality of speakers of the mobile terminal 100. Exemplary three dimensional audio technologies that may be utilized in accordance with embodiments of the present invention may include, but are not limited to, those available from Wave Arts, Inc. of Arlington, Mass., and Creative Technology Ltd. of Singapore.

Figure 4:
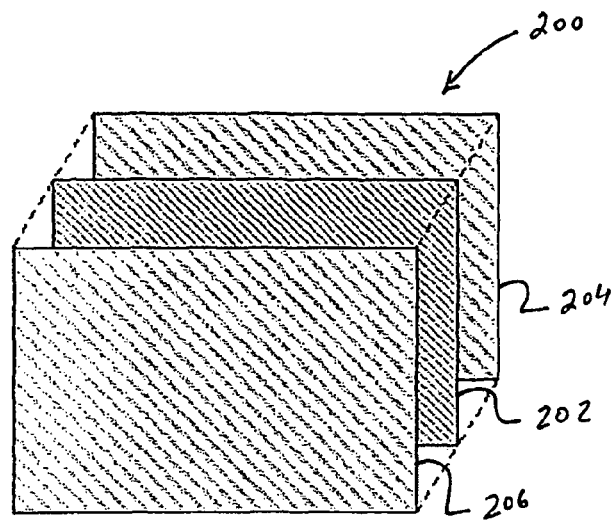
FIG. 4 is a perspective view of a representation of a virtual three dimensional space in which a three dimensional audio system can make sound appear to originate from any location, in accordance with some embodiments of the present invention.

FIG. 4 illustrates a virtual three dimensional space 200, in accordance with some embodiments of the present invention. In the illustrated virtual three dimensional space 200, a user of a mobile terminal 100 is positioned generally at a location indicated by plane 202, according to some embodiments of the present invention. The three dimensional audio system 160 can make sound appear to originate from any location within the virtual three dimensional space 200. For example, sound can be made to appear to originate from locations in front of the user, such as from a two dimensional matrix or plane 204. For example, plane 204 may represent the display 120 and the three dimensional audio system can make sound appear to originate from wherever the cursor is located on the display. For example, if a user positions a cursor in the upper left hand corner of a display of a mobile terminal, the three dimensional audio system 160 can make sound appear to originate from an upper left hand corner of the plane 204 in the three dimensional space 200. Sound can also be made to appear to originate from locations behind of the user, such as plane 206.

Figure 5:
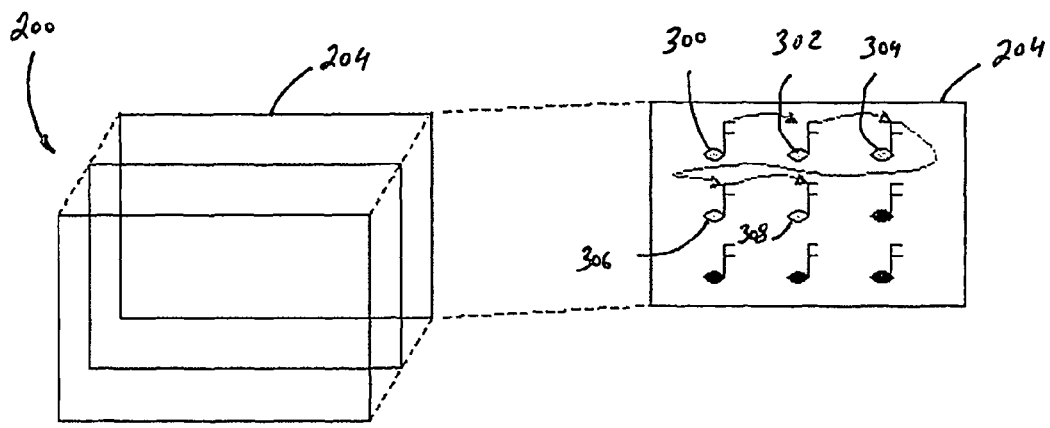
FIG. 5 illustrates sound appearing to originate from spaced-apart locations in a plane that is in front of a user in the virtual three dimensional space of FIG. 4 in response to a user sequentially pressing keys "1", "2", "3", "4" and "5" as illustrated in FIG. 3, in accordance with some embodiments of the present invention.

For example, in FIG. 5, sound generated in response to a user sequentially pressing keypad keys "1", "2", "3", "4" and "5" (FIG. 3), sound appears to originate from spaced-apart locations in a plane 204 that is in front of the user. In the illustrated embodiment, the sounds appear to originate from locations that correspond with the locations of the keys on the keypad. In other words, upon sequentially pressing keypad keys "1", "2", "3", "4" and "5" (FIG. 3), sounds sequentially appear to originate from locations 300-308 in plane 204, as illustrated in FIG. 5. The musical notes in the drawings are intended to indicate the locations where sound appears to originate from.

Figure 6A:
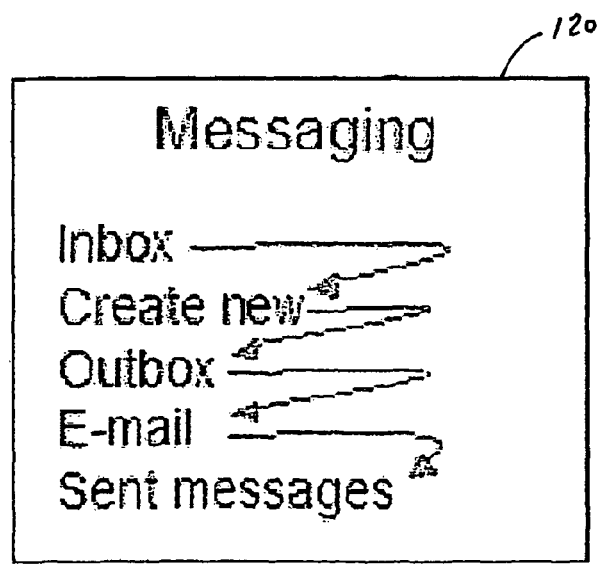
FIG. 6A illustrates a user scrolling down through displayed information in a menu displayed within the display of a mobile terminal.
Figure 6B:
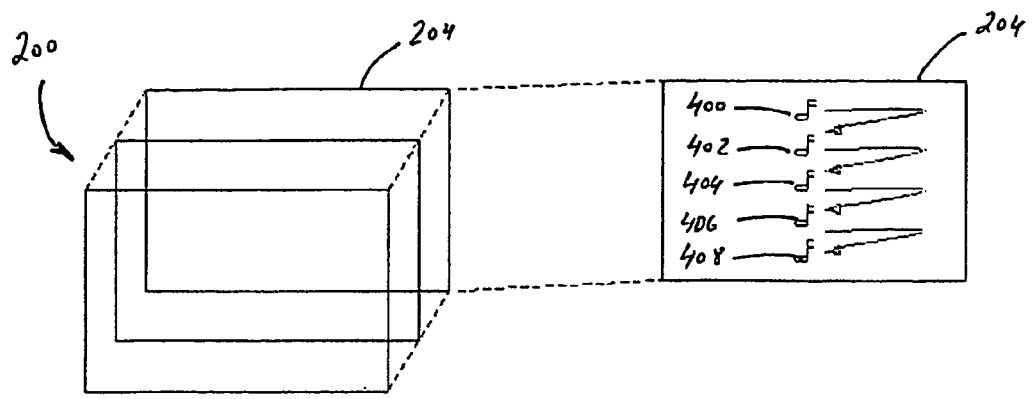
FIG. 6B illustrates sound appearing to originate sequentially from vertically spaced apart locations in a plane that is in front of a user in the virtual three dimensional space of FIG. 4 in response to a user scrolling down through displayed information in the menu of FIG. 6A, in accordance with some embodiments of the present invention.

As another example, in FIG. 6A, a user is scrolling down, via a keypad, within a menu displayed within the display 120 of the mobile terminal 100. In response, the user hears sounds as indicated in FIG. 6B. In FIG. 6B, sound appears to originate sequentially from vertically spaced apart locations in a plane 204 that is in front of the user. In other words, upon highlighting "Inbox" with the cursor (FIG. 6A), a sound appears to originate from location 400 in plane 204. As the user sequentially highlights "Create new", "Outbox", "E-mail", "Sent messages" in the display 120, sounds sequentially appear to originate from locations 402-408 in plane 204, as illustrated in FIG. 6B. In addition, one or more of pitch, tone, and volume may be varied at each location 400-408.

The sounds appearing to originate in front of (or in back of, or to the sides on a user, in accordance with embodiments of the present invention, need not appear to originate from the same plane within the virtual three dimensional space 200. Sounds may appear to originate from respective different planes within the three dimensional space 200. In other words, the three dimensional audio system 160 can make sound appear to originate from locations with varying depth within a virtual three dimensional space. For example, in FIG. 6B, sound originating from location 408 may actually be deeper within the virtual space 200 (i.e., the sound may originate from a plane deeper in the virtual space 200 than plane 204, relative to the user 10), than sound originating from location 400, etc.

Figure 7:
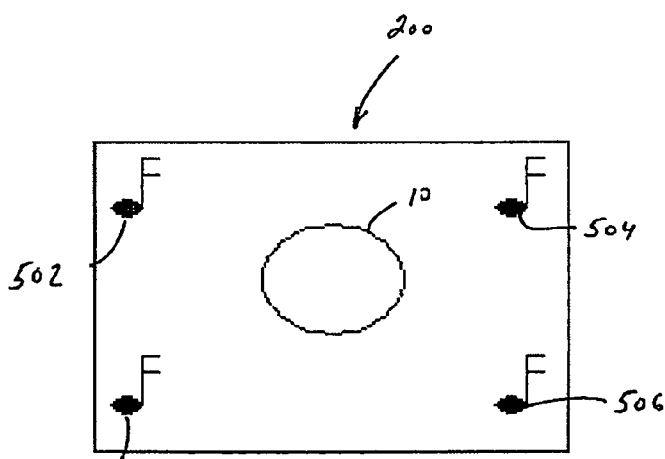
FIG. 7 is a plan view of the three dimensional space of FIG. 4 with a user located in a generally central location and with music appearing to originate from locations surrounding the user, in accordance with some embodiments of the present invention.

According to some embodiments of the present invention, the mobile terminal 100 is configured to play music, and the three dimensional audio system 160 is configured to make the music appear to originate from multiple locations in a virtual three dimensional space. For example, FIG. 7 is a plan view of the three dimensional space 200 illustrated in FIG. 4 with a user (indicated as 10) located in a generally central location (e.g., the location of plane 202 in FIG. 4). In the illustrated embodiment, music appears to originate from locations 500, 502, 504, 506 that surround the user 10.

According to some embodiments of the present invention, the three dimensional audio system 160 is configured to make a ringtone appear to originate from any location in a virtual three dimensional space in response to a mobile terminal 100 receiving an incoming call signal.

According to some embodiments of the present invention, the three dimensional audio system 160 is configured to make a ringtone appear to originate from a location in a virtual three dimensional space 200 that is in front of the user in response to the mobile terminal 100 receiving an incoming call signal. Positioning a ringtone in "front" of the user can facilitate obtaining the attention of the user that an incoming call is waiting to be answered. Similarly, sounds indicative of email messages, text messages, pages, and the like, may be positioned in front of a user by the three dimensional audio system 160 in order to obtain the attention of a user.

Figure 8:
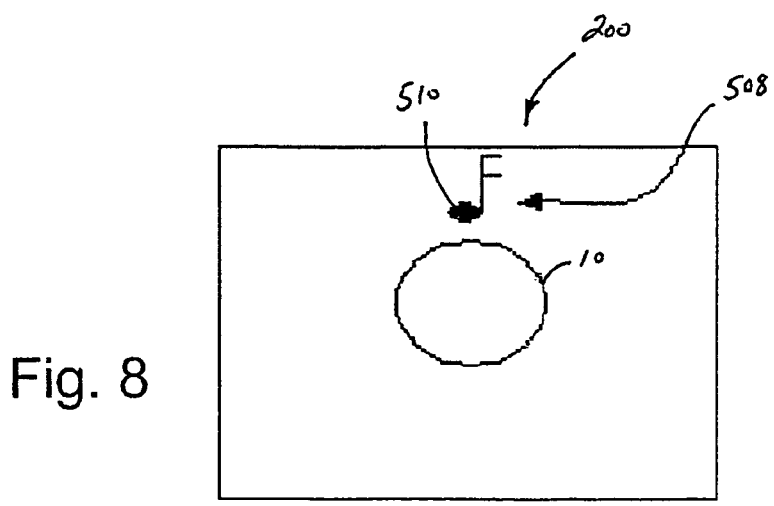
FIG. 8 is a plan view of the three dimensional space of FIG. 4 with a user located in a generally central location and that illustrates movement of a ringtone from an originating location to the side of the user to a location in front of the user, in accordance with some embodiments of the present invention.

According to some embodiments of the present invention, the three dimensional audio system 160 may be configured to "move" sound from one location to another. For example, in response to the mobile terminal 100 receiving an incoming call signal, the three dimensional audio system 160 may move a ringtone that appears to originate from the side of a user within a three dimensional space to a location in front of the user, as illustrated in FIG. 8. In FIG. 8, a ringtone appears to originate from location 508 that is somewhat to the side of the user 10 and is moved to a location 510 directly in front of the user 10.

Figure 9A:
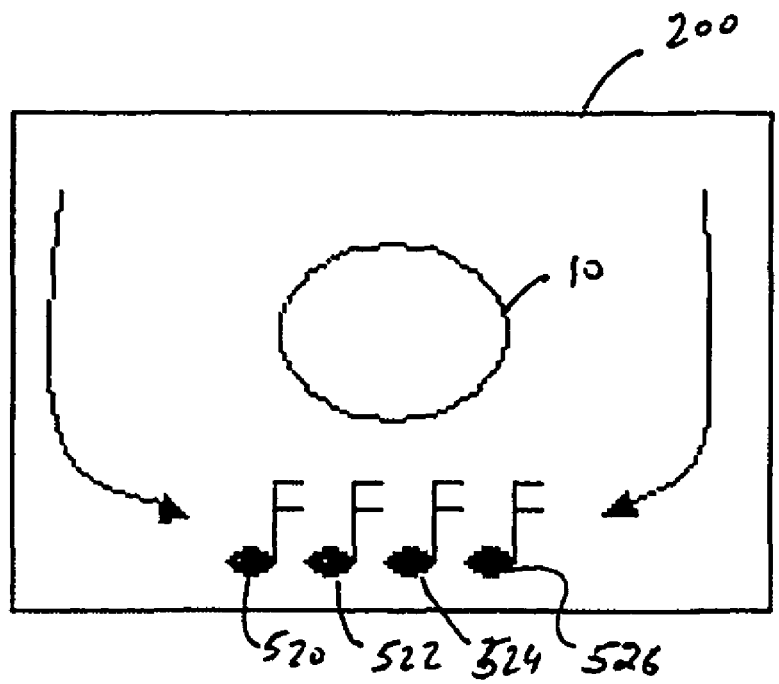
FIG. 9A is a plan view of the three dimensional space of FIG. 4 with a user located in a generally central location and that illustrates movement of music from the multiple originating locations of FIG. 7 to an originating location behind the user, in accordance with some embodiments of the present invention.
Figure 9B:
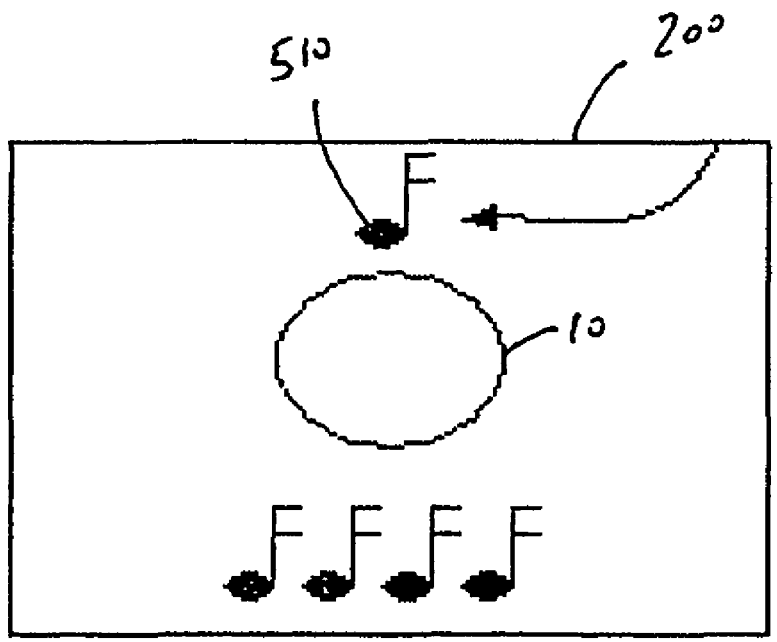
FIG. 9B is a plan view of the three dimensional space of FIG. 4 with a user located in a generally central location and that illustrates movement of a ringtone from an originating location to the side of the user to a location in front of the user after music has been moved from the multiple originating locations of FIG. 7 to an originating location behind the user, in accordance with some embodiments of the present invention.

According to some embodiments of the present invention, in response to a mobile terminal 100 receiving an incoming call signal, the three dimensional audio system 160 is configured to move music that is playing and that appears to originate from one or more locations in a virtual three dimensional space to a location that is behind the user, and to make a ringtone appear to originate from a location that is in front of the user. For example, as illustrated in FIG. 7, music is appearing to originate from various locations 500-504 in the virtual three dimensional space 200. In FIGS. 9A-9B, the mobile terminal 100 is receiving an incoming call signal and the three dimensional audio system 160 moves the music to appear to originate from locations 520-526 behind the user 10 (FIG. 9A) and has made the ringtone appear to originate from a location 510 that is in front of the user. Thus, the three dimensional audio system 160 is configured to obtain the attention of a user when necessary by moving sounds to different locations.

Referring back to FIG. 1, the mobile terminal 100, according to some embodiments of the present invention, may include a hands free headset 170 that is in wireless communication with the processor 135 and the three dimensional audio system 160. The headset includes an earplug that is configured to be inserted into the ear of a user. The earplug includes one or more speakers and the three dimensional audio system 160 is configured to make a user of the radiotelephone appear to be positioned at a generally central location in a virtual three dimensional space and to make sound appear to originate from any location in the virtual three dimensional space. The various embodiments described herein can be implemented via the headset 170.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An electronic device, comprising:
a housing that encloses a processor and a speaker;
a display located on the housing, wherein the display is in communication with the processor;
a keypad located on the housing, wherein the keypad is in communication with the processor, and wherein the keypad is responsive to user input for navigating a cursor within the display; and
a three dimensional audio system in communication with the processor and the speaker, wherein the three dimensional audio system audibly indicates navigational movement of the cursor within the display via the speaker by variations in one or more of time delay, pitch, tone and volume, such that the three dimensional audio system is configured to make sound emitted by the speaker appear to originate from any of a plurality of locations in a cursor virtual three dimensional space, and such that the three dimensional audio system is configured to make the sound emitted by the speaker appear to originate from wherever the cursor is located on the display.

2. The electronic device of claim 1, wherein the three dimensional audio system is configured to make a user of the electronic device appear to be positioned at a generally central location in the virtual three dimensional space.

3. The electronic device of claim 1, wherein the electronic device is configured to play music, and wherein the three dimensional audio system is configured to make the music appear to originate from multiple locations in the virtual three dimensional space.

4. A radiotelephone, comprising:
a housing that encloses a processor and a speaker;
a display located on the housing, wherein the display is in communication with the processor;
a keypad located on the housing, wherein the keypad is in communication with the processor, and wherein the keypad is responsive to user input for navigating a cursor within the display; and
a three dimensional audio system in communication with the processor and the speaker, wherein the three dimensional audio system audibly indicates navigational movement of the cursor within the display via the speaker by variations in one or more of time delay, pitch, tone and volume, such that the three dimensional audio system is configured to make sound emitted by the speaker appear to originate from any of a plurality of locations in a cursor virtual three dimensional space, and such that the three dimensional audio system is configured to make the sound emitted by the speaker appear to originate from wherever the cursor is located on the display, and wherein the three dimensional audio system is configured to make a user of the radiotelephone appear to be positioned at a generally central location in the cursor virtual three dimensional space.

5. The radiotelephone of claim 4, wherein the three dimensional audio system is configured to make the sound emitted by the speaker appear to originate from a two dimensional matrix located in front of the user in response to movement of the cursor within the display by the user.

6. The radiotelephone of claim 4, wherein the three dimensional audio system is configured to make a ringtone appear to originate from any location in the virtual three dimensional space in response to the radiotelephone receiving an incoming call signal.

7. The radiotelephone of claim 4, wherein the three dimensional audio system is configured to make a ringtone appear to originate from a location in the virtual three dimensional space that is in front of the user in response to the radiotelephone receiving an incoming call signal.

8. The radiotelephone of claim 4, wherein the radiotelephone is configured to play music, and wherein the three dimensional audio system is configured to make the music appear to originate from multiple locations in the virtual three dimensional space.

9. The radiotelephone of claim 8, wherein, in response to the radiotelephone receiving an incoming call signal, the three dimensional audio system is configured to make the music that is playing appear to originate from a location in the virtual three dimensional space that is behind the user and to make a ringtone appear to originate from another location in the virtual three dimensional space that is in front of the user.

10. The radiotelephone of claim 4, wherein the radiotelephone comprises a plurality of speakers, and wherein the three dimensional audio system is configured to variably time delay sound signals provided to the speakers to vary location of a perceived source of a combined sound emitted from the speakers.

11. The radiotelephone of claim 4, wherein the radiotelephone comprises a plurality of speakers, and wherein the three dimensional audio system is configured to vary volume and/or tonal characteristics of sound signals provided to the speakers to vary location of a perceived source of a combined sound emitted from the speakers.

12. The radiotelephone of claim 4, further comprising a hands free headset in wireless communication with the processor and the three dimensional audio system, wherein the headset comprises an earplug that is configured to be inserted into the ear of the user, wherein the earplug comprises one or more speakers, wherein the three dimensional audio system is configured to emit sound via the one or more earplug speakers, and wherein the three dimensional audio system is configured to make the user of the radiotelephone appear to be positioned at a generally central location in the virtual three dimensional space and to make the sound emitted via the one or more earplug speakers appear to originate from any location in the virtual three dimensional space.

13. A radiotelephone, comprising:
- a housing that encloses a processor and a speaker;
- a touch-sensitive display located on the housing that is configured to sense the position of an object in contact therewith and to transmit a corresponding signal to the processor, and wherein the display is responsive to user input for navigating a cursor therewithin; and
- a three dimensional audio system in communication with the processor and speaker, wherein the three dimensional audio system audibly indicates navigational movement of the cursor via the speaker by variations in one or more of time delay, pitch, tone and volume, such that the three dimensional audio system is configured to make sound emitted by the speaker appear to originate from any of a plurality of locations in a cursor virtual three dimensional space, and such that the three dimensional audio system is configured to make the sound emitted by the speaker appear to originate from wherever the cursor is located on the display, and wherein the three dimensional audio system is configured to make a user of the radiotelephone appear to be positioned at a generally central location in the cursor virtual three dimensional space.

14. The radiotelephone of claim 13, wherein the three dimensional audio system is configured to make the sound emitted by the speaker appear to originate from a two dimensional matrix located in front of the user in response to movement of the cursor within the display by the user.

15. The radiotelephone of claim 13, wherein the three dimensional audio system is configured to make a ringtone appear to originate from any location in the virtual three dimensional space in response to the radiotelephone receiving an incoming call signal.

16. The radiotelephone of claim 13, wherein the radiotelephone is configured to play music, and wherein the three dimensional audio system is configured to make music appear to originate from multiple locations in the virtual three dimensional space.

17. The radiotelephone of claim 16, wherein, in response to the radiotelephone receiving an incoming call signal, the three dimensional audio system is configured to make music that is playing appear to originate from a location in the virtual three dimensional space that is behind the user and to make a ringtone appear to originate from a location in the virtual three dimensional space that is in front of the user.

18. The radiotelephone of claim 13, further comprising a hands free headset in wireless communication with the processor and the three dimensional audio system, wherein the headset comprises an earplug that is configured to be inserted into the ear of the user, wherein the earplug comprises one or more speakers, wherein the three dimensional audio system is configured to emit sound via the one or more earplug speakers, and wherein the three dimensional audio system is configured to make the user of the radiotelephone appear to be positioned at a generally central location in the virtual three dimensional space and to make the sound emitted via the one or more earplug speakers appear to originate from any location in the virtual three dimensional space.

* * * * *